(12) United States Patent
Chun et al.

(10) Patent No.: US 6,553,149 B1
(45) Date of Patent: Apr. 22, 2003

(54) SHAPE INFORMATION CODING AND DECODING APPARATUS FOR ADAPTIVELY BORDERING AND METHOD THEREFOR

(75) Inventors: Sung-Moon Chun, Kyoungki-do (KR); Dong-Kyoo Shin, Seoul (KR); Joo-Hee Moon, Seoul (KR)

(73) Assignee: Hyundai Electronics Ind. Co., LTD, Kyoungki-do (KR)

( * ) Notice: Subject to any disclaimer, the term of this patent is extended or adjusted under 35 U.S.C. 154(b) by 0 days.

(21) Appl. No.: 09/173,883

(22) Filed: Oct. 16, 1998

(30) Foreign Application Priority Data

Oct. 17, 1997 (KR) .............................. 97-53477

(51) Int. Cl.[7] .............................. G06K 9/36; H04B 1/66
(52) U.S. Cl. .................. 382/243; 382/239; 375/240.08
(58) Field of Search ................. 382/243, 236, 382/238, 239, 166, 237, 699; 348/416, 397, 398, 415, 438, 699; 375/240.12, 240.02, 240.11, 240.08

(56) References Cited

U.S. PATENT DOCUMENTS 5,659,631 A * 8/1997 Gormish et al. ............ 382/166
5,675,379 A    10/1997 Kato et al. .................. 348/97
5,991,447 A *  11/1999 Eifrig ........................ 382/236
6,057,884 A *   5/2000 Chen et al. ................. 348/416
6,133,955 A *  10/2000 Han ........................... 382/238

\* cited by examiner

*Primary Examiner*—Wenpeng Chen
(74) *Attorney, Agent, or Firm*—J. Harold Nissen; Lackenbach, Siegel

(57) ABSTRACT

In a shape information coding apparatus and method of bordering a binary alpha block (BAB) by pixels to construct contexts when coding binary shape information, adaptive bordering and coding of the shape information is performed in such a manner of receiving the shape information and storing a BAB; determining whether to perform frame mode coding or field mode coding based upon characteristics of the BAB; and when the frame mode coding is selected, performing frame mode bordering before performing frame BAB coding, and when the field mode coding is selected, performing field mode bordering before performing field BAB coding.

3 Claims, 22 Drawing Sheets

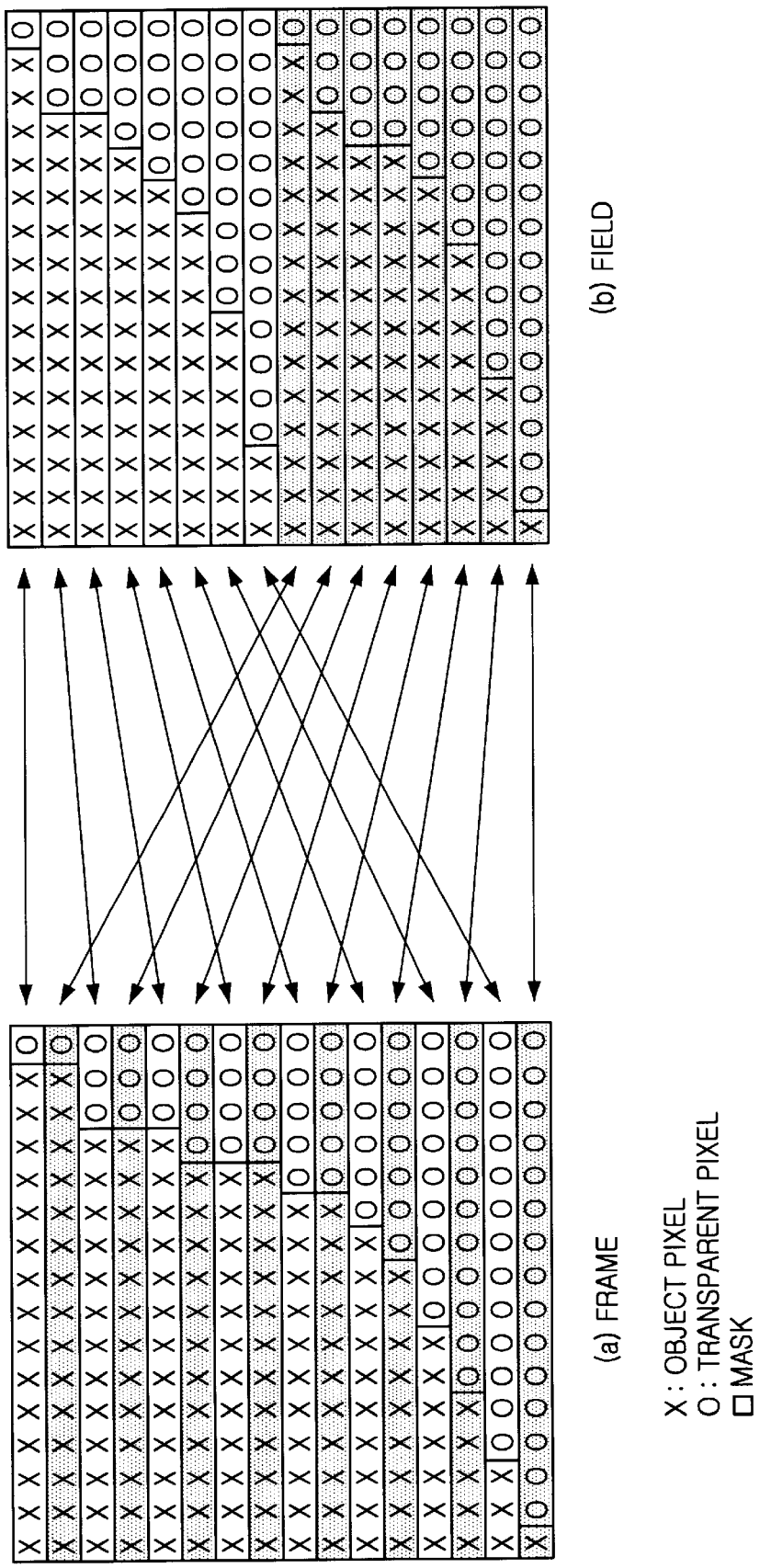

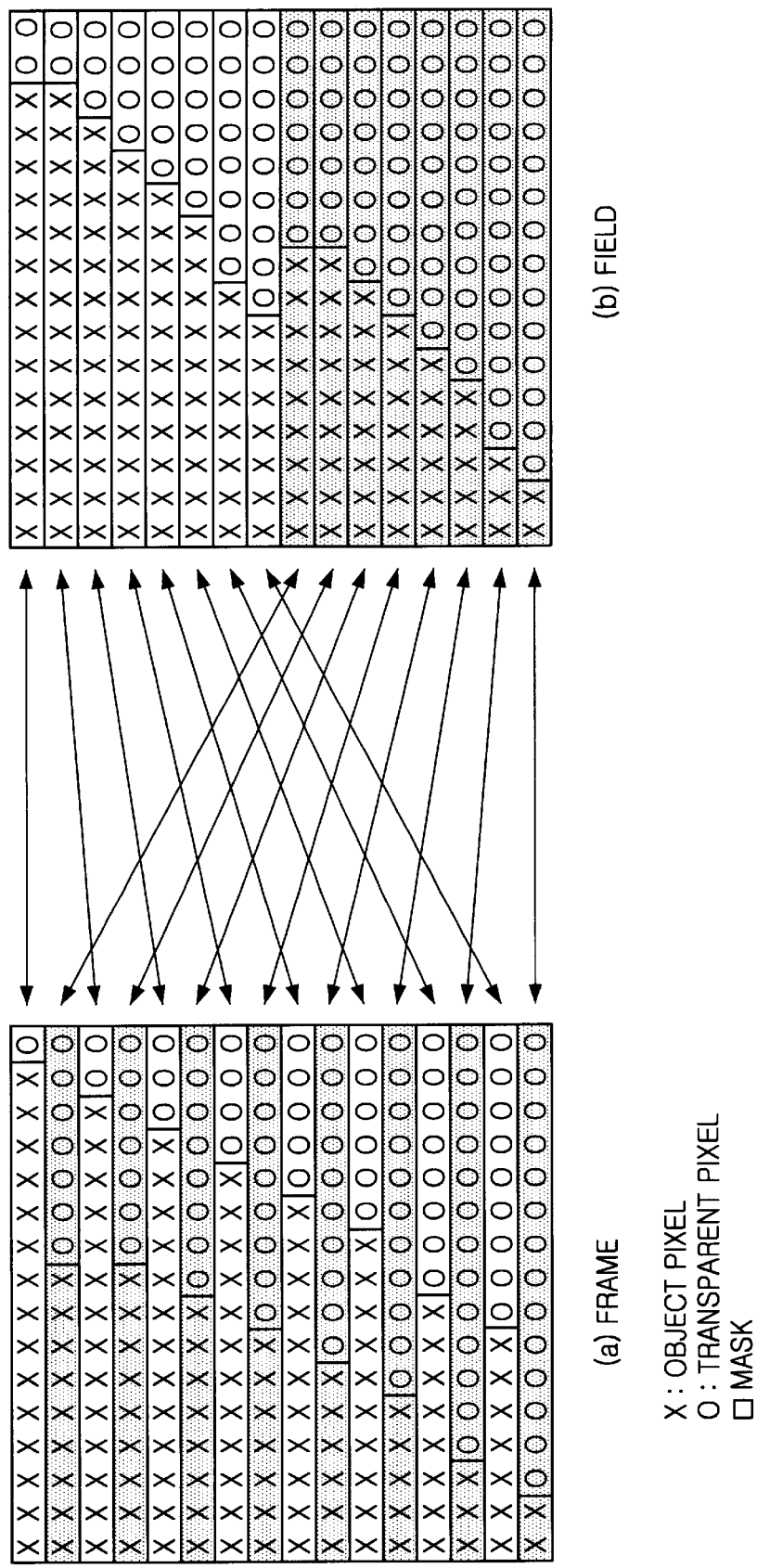

X : MC BAB PIXEL
X : MC BAB PIXEL
☐ : TOP FIELD
▨ : BOTTOM FIELD

X : MC BAB PIXEL
X : MC BAB PIXEL
□ : TOP FIELD
▨ : BOTTOM FIELD

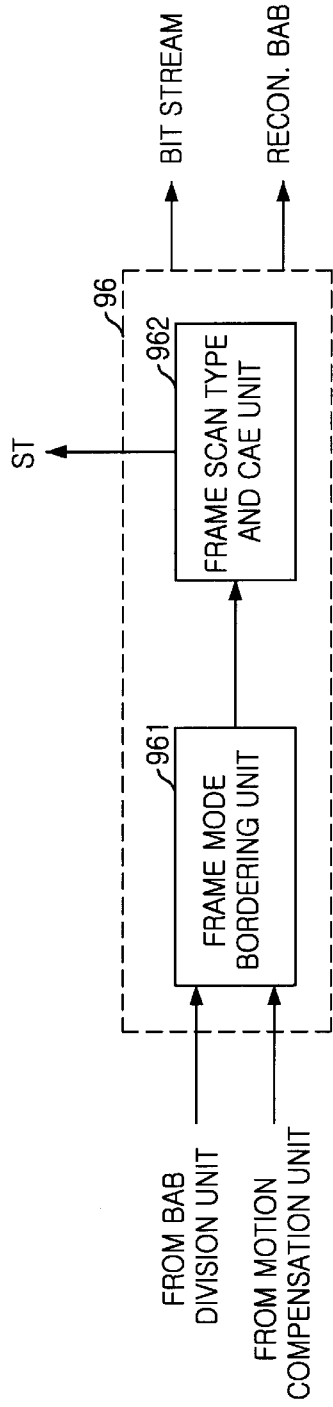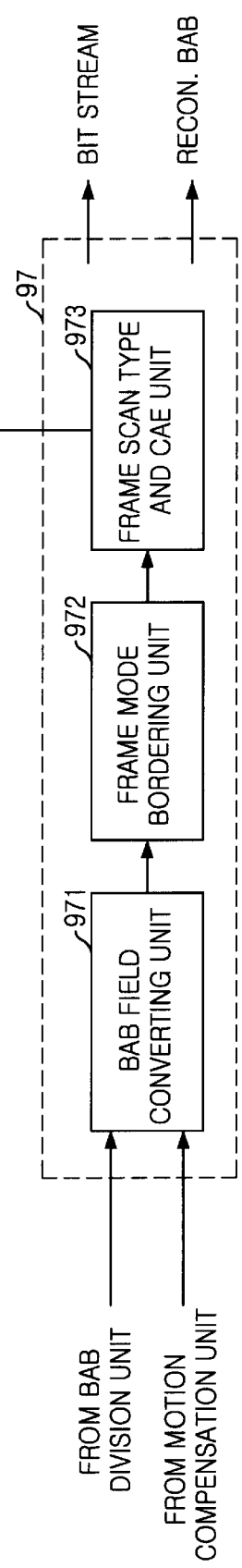

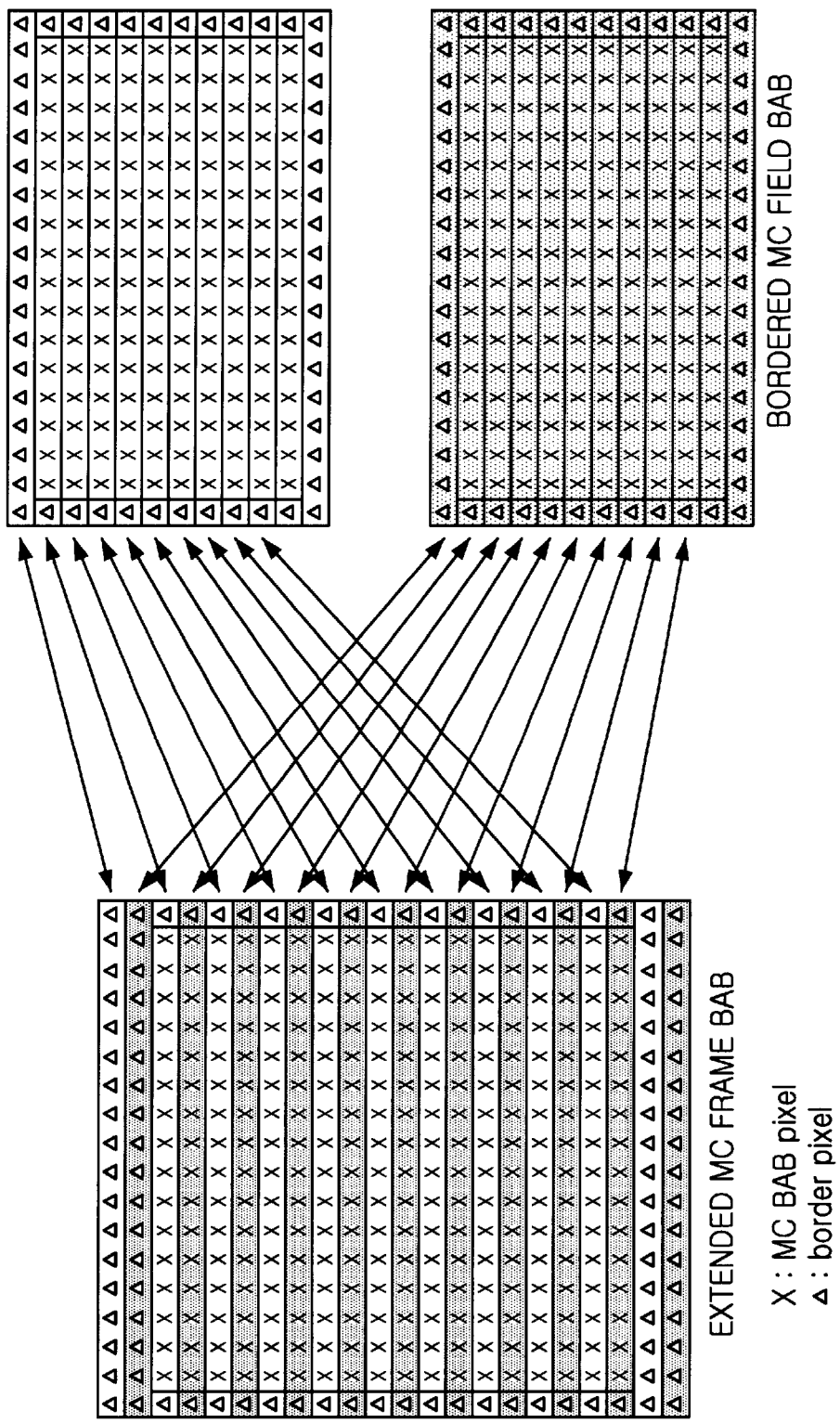

FRAME

TOP FIELD

BOTTOM FIELD

SHAPE INFORMATION CODING AND DECODING APPARATUS FOR ADAPTIVELY BORDERING AND METHOD THEREFOR

BACKGROUND OF THE INVENTION

1. Field of the Invention

The present invention relates to video coding and decoding and more particularly to a shape information coding and decoding apparatus for adaptively bordering and method therefor, wherein bordering is performed with respect to blocks of shape information when forming contexts in order to context-based arithmetic encode a shape in a picture.

2. Description of Related Art

There is a case that only a certain particular object in a frame is intended to be processed to increase coding efficiency or improve picture quality in processing video information. In this case, shape information of the particular object is required to separate the particular object from a background.

A block of a particular object's shape information includes pixels for the particular object, the pixels having a specified value (for example, "1"), and pixels for others except the object, the pixels having a specified value "0". The shape information of the particular object is divided into blocks of a predetermined size (for example, 16×16 and 8×8) and a specified operation is performed with respect to ambient pixels of the pixels to be coded in order to code the shape information within a block.

FIG. 1 is a block diagram of a conventional object-based video coder.

Concepts of a shape coder and a video object planes (VOP) are introduced here. The VOP indicates an object at a certain point in a time domain of a content having a predetermined shape which can be accessed and edited by a user. The information should be coded by each VOP for support of a content-based functionality.

Primarily, signals of a picture are classified into shape information and texture information and two types of information are respectively inputted to a shape coding unit 11 and motion estimation unit 12.

The shape coding unit 11 performs lossy coding or lossless coding with respect to the shape information of a relevant frame. Reconstructed shape information is inputted to both motion compensation unit 13 and texture coding unit 17. Both the motion compensation unit 13 and texture coding unit 17 operate based upon an object. A shape information bit stream, which is another output of the shape coding unit 11, is inputted to a multiplexer 18.

The motion estimation unit 12 estimates motion information of a current frame's texture information using input texture information of the current frame and texture information of a previous frame which is stored in a previous reconstructed frame memory 14. The estimated motion information is inputted to the motion compensation unit 13 while a motion information bit stream is encoded and inputted to the multiplexer 18. The motion compensation unit 13 performs motion compensation using the motion information obtained through the motion estimation unit 12 and the previous reconstructed frame received from the previous reconstructed frame memory 14.

The texture coding unit 17 codes a prediction error. The prediction error is a difference between input texture information obtained through a subtracter 15 and motion compensated texture information obtained through the motion compensation unit 13. A texture bit stream which is generated through the coding at the texture coding unit 17 is inputted to the multiplexer 18 and an error signal of reconstructed texture information is inputted to an adder 16. The previous reconstructed frame memory 14 stores a previous reconstructed frame signal received from the adder 16. The previous reconstructed frame signal is obtained by adding the error signal of the reconstructed texture information to the motion compensated signal.

Digital video may be classified into progressive video and interlaced video according to frame constructing methods. For the progressive video, a frame is constructed in such a manner that lines consecutively progresses from the top to the bottom. For the interlaced video, a frame is constructed in such a manner that a field of odd lines is primarily constructed and then even lines in the other field are interlaced with the odd lines of the first field. A height (the number of lines) of the field is a half of the height of the frame. This is illustrated in FIGS. 2a and 2b. FIG. 2a shows a frame of the progressive video and FIG. 2b shows two fields -a top field and a bottom field- and a frame of the interlaced video. In FIGS. 2a and 2b, the top and bottom fields consist of lines (solid arrows in the top field and dotted arrows in the bottom field) and the lines of each field interlace (the solid arrows are interlaced with the dotted arrows) to construct an interlaced frame.

When the top and bottom fields are constructed, as shown in FIG. 2b, there is a time gap between the two fields and the top field precedes the bottom field. In other cases, the bottom field may precede the top field. For the lines forming a frame in an interlaced video, the lines constructing the top field and the lines constructing the bottom field are separately scanned by each field. Because of the time gap between the top field and the bottom field, signal characteristics of neighboring lines in the interlaced frame can be different.

Particularly, in case of a picture having a lot of motion, this feature described above is prominent. When applying video coding functions developed in accordance with properties of the progressive video, such as motion estimation, motion compensation, and discrete cosine transform (DCT), to the coding of the interlaced video, reduction of coding efficiency is caused. Technology, such as field-based motion estimation and compensation and adaptive frame/field DCT, has been developed to overcome this problem. Such technology is disclosed in the standard MPEG-2 established by the ISO/IEC JTC1/SC29/WG11 for applications of digital TV and the like. The technology has been frequently applied to actual application products.

FIGS. 3a and 3b show interlaced shape information where an object has no motion or a little motion between two fields. As shown in FIG. 3a, correlation between lines in a frame is higher compared with that in each field, so it is better to code the shape information from a frame than from each field in this case.

FIGS. 4a and 4b show shape information where an object has much motion between two fields. As shown in FIG. 4a where the lines are grouped into each field, variation between shape information of each line is little and correlation between lines is high in the same field. However, as shown in FIG. 4a, when considering a whole frame, the variation between shape information of each line is larger, so the correlation between lines is lower. Therefore, coding efficiency is reduced when coding the shape information from the frame.

It is best to adaptively select one between a field coding mode and a frame coding mode rather than to use only one mode when coding the interlace shape information.

FIG. 5a shows a context for performing context-based arithmetic encoding (CAE) in an INTRA mode. A value of a pixel 51 is encoded through a specified operation using pixels C0 to C9 neighboring with the pixel 51 to be encoded. FIG. 5b shows a context for performing the CAE in an INTER mode. A value of a pixel 52 is encoded through a specified operation using pixels C0 to C3 neighboring with the pixel 52 to be encoded in a current block and a pixel C6 corresponding to the pixel 52 and its neighboring pixels C4, C5, C7, and C8 in a previous frame.

When coding shape information of a particular object, the information is divided into binary alpha blocks (BABs) of a predetermined size, for example, 16×16. In this case, bordering is performed to construct contexts of outer pixels of a BAB. As shown in FIGS. 5a and 6, if the pixel 51 to be encoded is located in the left border of a BAB 61, values of the pixels C0, C1, C5, C6, and C9 in FIG. 5a cannot be acknowledged, so the BAB 61 is bordered by a left border 63 and a left top border 64 respectively at its left and left top sides. Similarly, if the pixel 51 to be encoded is located in the top border of the BAB 61, values of the pixels C2 to C9 in FIG. 5a cannot be acknowledged, so the BAB 61 is bordered by a top border 62 and a right top border 65 respectively at its top and right top side. The bordering is a process of taking border values from neighborhood BABs.

As shown in FIG. 6, the current BAB is bordered by a top border, a left border, a left top border, and a right top border but a bottom and a right borders are omitted. As shown in FIG. 7, for a motion compensated (MC) BAB 71, the bordering is performed with respect to each single pixel at the left, right, top, and bottom borders. When the pixel 51 in FIG. 5a is at the border of the BAB and the values of the pixels C7, C3, and C2 cannot be acknowledged in the INTRA mode, an operation is performed under the definition of C7=C8, C3=C4, and C2=C3. When the pixel 51 in FIG. 5a is at the border of the BAB and the value of the pixel C1 cannot be acknowledged in the INTER mode, an operation is performed under the definition of C1=C2. In the INTER mode, values of the pixels C4 to C8 in FIG. 5b have already been known because they are the pixels of the previous frame.

FIGS. 8a and 8b respectively show a bordered frame BAB and its fields. A bordered current frame BAB is divided into two fields as shown in FIG. 8b. In FIG. 8b, a result of the bordering performed with respect to the frame BAB is left just as it is and pixels in the frame BAB are grouped into separate fields and then the CAE is performed. As shown in FIG. 8b, there are cases that a pixel of a top field in the BAB 81 is bordered by a frame bordering pixel 83 of a bottom field. In this regard, a value of the pixel of the field BAB 81 does not coincide with that of the bordering pixel 83. Such bordering causes decrease of correlation in constructing the context, so a lot of coded bits are generated. When individually performing the CAE with respect to each field with the bordering pixels of the frame BAB maintained, as shown in FIGS. 8a and 8b, some outer pixel values do not coincide with their bordering pixel values. This causes generation of many coded bits, thereby deteriorating coding efficiency.

SUMMARY OF THE INVENTION

Accordingly, the present invention is directed to a shape information coding and decoding apparatus for adaptively bordering and method therefor that substantially obviates one or more of the limitations and disadvantages of the related art.

An objective of the present invention is to provide a shape information coding and decoding apparatus for adaptively bordering and method therefor, wherein BABs are adaptively bordered according to a frame/field mode.

Another objective of the present invention is to provide a shape information coding and decoding apparatus for adaptively bordering and method therefor, wherein pixels in a top field are bordered by pixels in a top field and pixels in a bottom field are bordered by pixels in a bottom field when coding a block of shape information in an interlaced picture.

Additional features and advantages of the invention will be set forth in the description which follows, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, adaptive bordering and coding of the shape information is performed in such a manner of receiving the shape information and storing a BAB; determining whether to perform frame mode coding or field mode coding based upon characteristics of the BAB; and when the frame mode coding is selected, performing frame mode bordering before performing frame BAB coding, and when the field mode coding is selected, performing field mode bordering before performing field BAB coding. In the field mode bordering, a top field in said BAB is bordered by pixels of top fields and a bottom field in said BAB is bordered by pixels of bottom fields.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 3a and 3b show a frame of a still picture or a picture having little motion and two fields constructing the frame;

FIGS. 4a and 4b show a frame of a picture having much motion and two fields constructing the frame;

FIGS. 10a and 10b are block diagrams of a frame mode bordering and coding unit and a field mode bordering and coding unit for performing adaptive bordering;

FIGS. 11a and 11b show field bordering of a motion compensated (MC) BAB and field bordering of a current BAB;

FIGS. 18a to 18c show embodiments of MC BAB field mode shape information in an INTER mode;

DETAILED DESCRIPTION OF PREFERRED EMBODIMENT

Reference will now be made in detail to the preferred embodiments of the present invention, examples of which are illustrated in the accompanying drawings.

With reference to the accompanying drawings, embodiments according to the present invention will now be described in detail.

Figure 9:
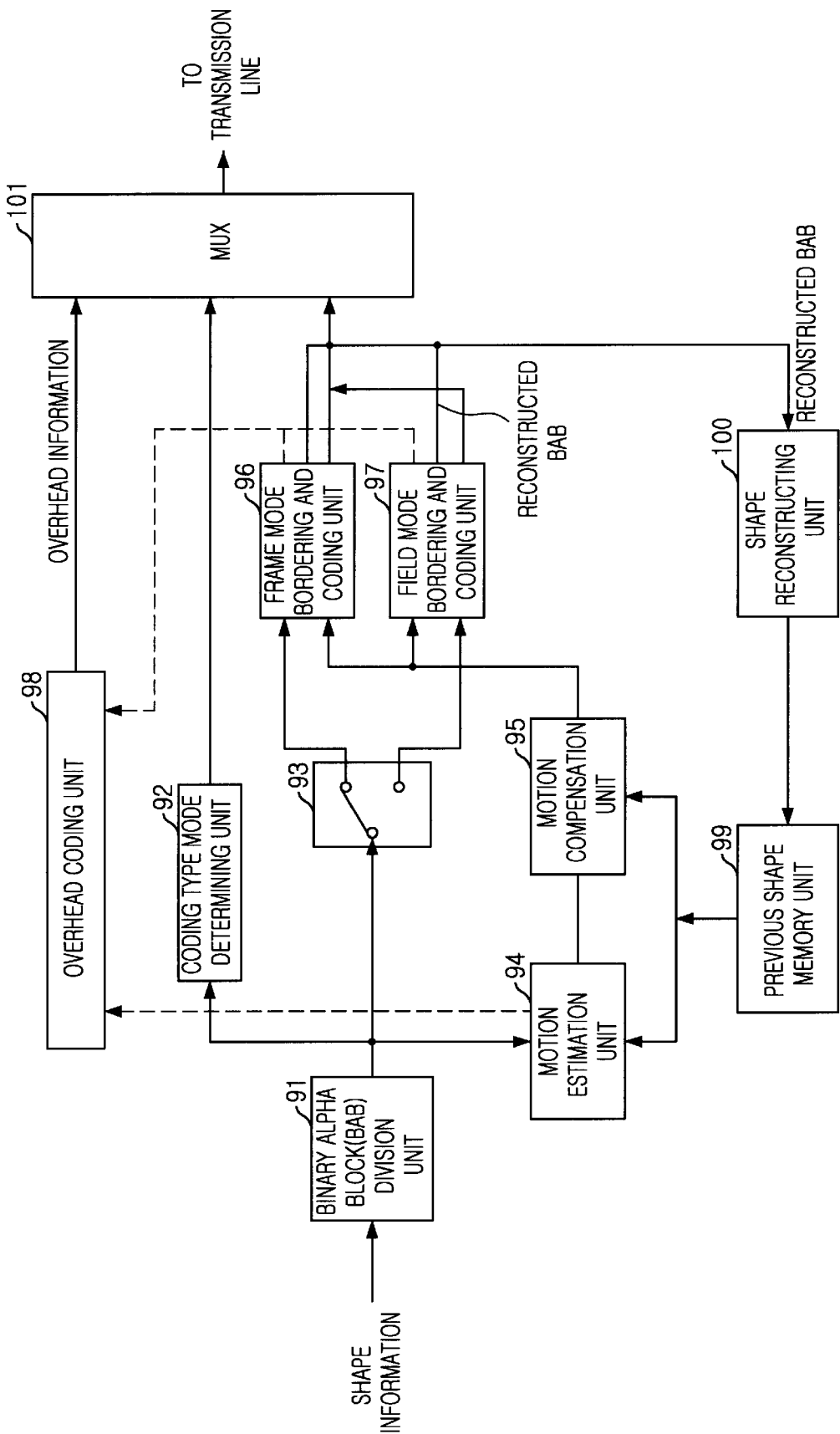
FIG. 9 is a block diagram of a shape information coding apparatus for adaptively bordering according to the present invention.

FIG. 9 is a block diagram of an embodiment of an interlaced coding apparatus having an adaptive bordering unit according to the present invention.

A BAB division unit 91 divides input binary shape information into multiple BABs of a predetermined size (e.g., 16×16). A coding mode determining unit 92 checks correlation with respect to the BAB received from the BAB division unit 91 and determines whether to perform frame mode coding or field mode coding. A switching unit 93 switches the BAB received from the BAB division unit 91 according to a coding mode signal produced by the coding mode determining unit 92. When the coding mode signal designates a frame mode, the switching unit 93 switches the input BAB to a frame mode bordering and coding unit 96. Alternatively, when the coding mode signal indicates a field mode, the switching unit 93 switches the input BAB to a field mode bordering and coding unit 97. A motion estimation unit 94 estimates motion with respect to the input BAB from the BAB division unit 91 and a previous shape information frame to produce motion information. A motion compensation unit 95 compensates the current BAB for motion using the motion information received from the motion estimation unit 94 and the previous shape information frame. The frame mode bordering and coding unit 96 receives the BAB from the BAB division unit 91 and a motion compensated BAB from the motion compensation unit 95 and borders and codes the shape information in units of a frame. The field mode bordering and coding unit 97 receives the BAB from the BAB division unit 91 and a motion compensated BAB from the motion compensation unit 95 and borders and codes the shape information in units of a field. A shape reconstructing unit 100 reconstructs the shape information from coded data received from the frame mode bordering and coding unit 96 and the field mode bordering and coding unit 97. A previous shape memory 99 receives the reconstructed shape information from the shape reconstructing unit 100 and stores it in the form of previous shape information. An overhead coding unit 98 receives the motion information from the motion estimation unit 94 and the coded data (e.g., conversion ratio, scan type, BAB_Type, and so on) from the frame mode bordering and coding unit 96 and the field mode bordering and coding unit 97 and produces overhead information. A multiplexer 101 multiplexes the coded data received from the frame mode bordering and coding unit 96 and the field mode bordering and coding unit 97, the coding mode signal from the coding mode determining unit 92, and the overhead information received from the overhead coding unit 99 and then forwards a result of the multiplexing.

Once binary shape information is inputted into this apparatus, the binary shape information is divided into blocks of a predetermined size (e.g., 16×16 or 8×8) at the BAB division unit 91 and sent to both the coding mode determining unit 92 and the motion estimation unit 94. The coding mode determining unit 92 determines whether to perform frame mode coding or field mode coding based upon correlation of the shape information in a top and a bottom fields forming a BAB frame. The coding mode determining unit 92 then outputs the coding mode signal indicating a determined mode to the switching unit 93. The switching unit 93 switches the BAB received from the BAB division unit 91 to the frame mode bordering and coding unit 96 or the field mode bordering and coding unit 97 according to the coding mode signal. The frame mode bordering and coding unit 96 performs the bordering and CAE with respect to the frame BAB. The field mode bordering and coding unit 97 performs the bordering and CAE with respect to the field BAB.

FIGS. 10a and 10b are block diagrams of the frame mode bordering and coding unit and the field mode bordering and coding unit, each having an adaptive bordering unit according to the present invention.

The frame mode bordering and coding unit 96 comprises a frame mode bordering unit 961 and a frame scan type and CAE unit 962. The field mode bordering and coding unit 97 comprises a BAB field converting unit 971, a field mode bordering unit 972, and a field scan type and CAE unit 973.

To solve the problem that correlation between BAB pixels and their bordering pixels is decreased when the bordering is performed with respect to the frame BAB while the coding is performed with respect to the field BAB, the field mode bordering and coding unit 97 is equipped with the field mode bordering unit 972 to provide a bordering method different from that provided through the frame mode bordering and coding unit 96.

Figure 11B:
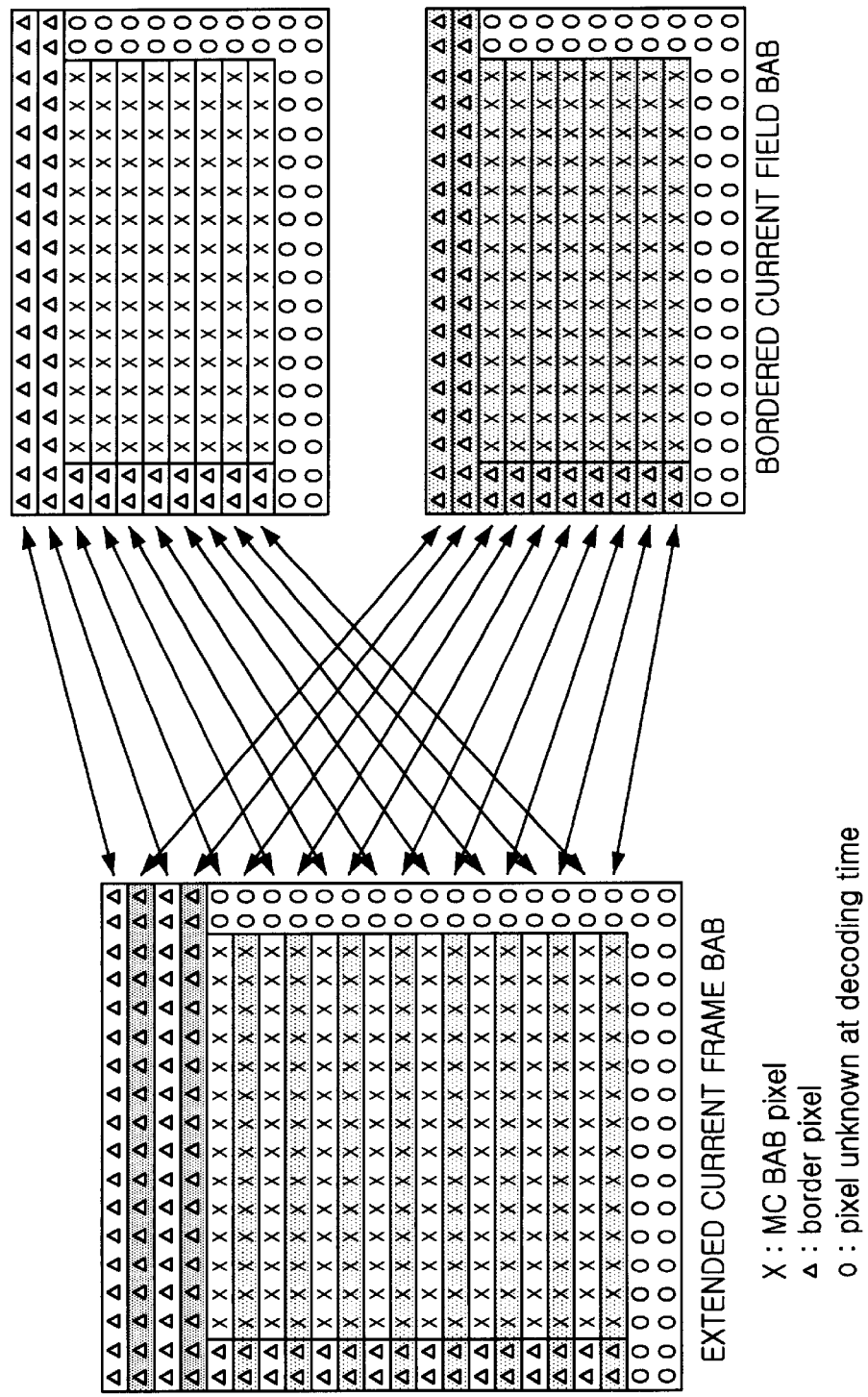

FIG. 11a shows how a top field and a bottom field are bordered from a bordered MC BAB. FIG. 11b shows how each field is bordered from a bordered current BAB. When performing the bordering with respect to each field, bordering pixel values of the 8×16 top field is taken from top fields in neighboring BABs and bordering pixel values of the 8×16 bottom field is taken from bottom fields in neighboring BABs.

Figure 12:
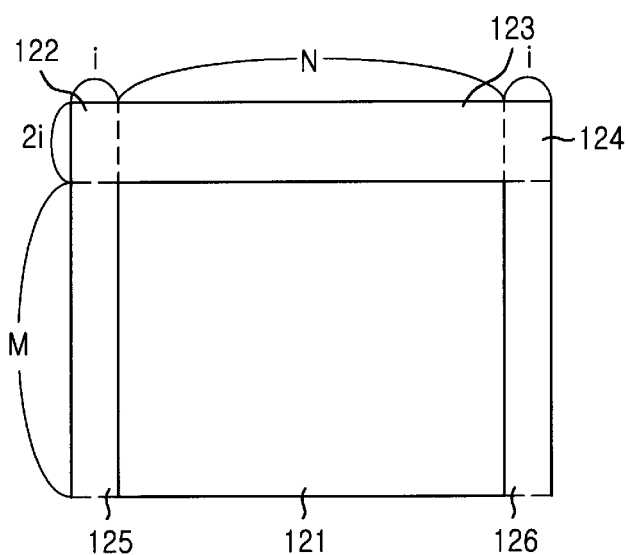
FIG. 12 shows an embodiment of shape information where bordering is performed in a frame mode according to the present invention.

FIG. 12 is an embodiment of a bordered frame mode shape information according to the present invention.

A block 121 of shape information to be coded has a size of M×N. The block 121 is bordered by 2i pixels at its top side and i pixels at its right and left sides. A top border 123 has a size of 2i×N. A left top border 122 and a right top border 124 have a size of 2i×i. A left border 125 and a right border 126 have a size of M×i. A character "i" is a bordering width.

Figure 13:
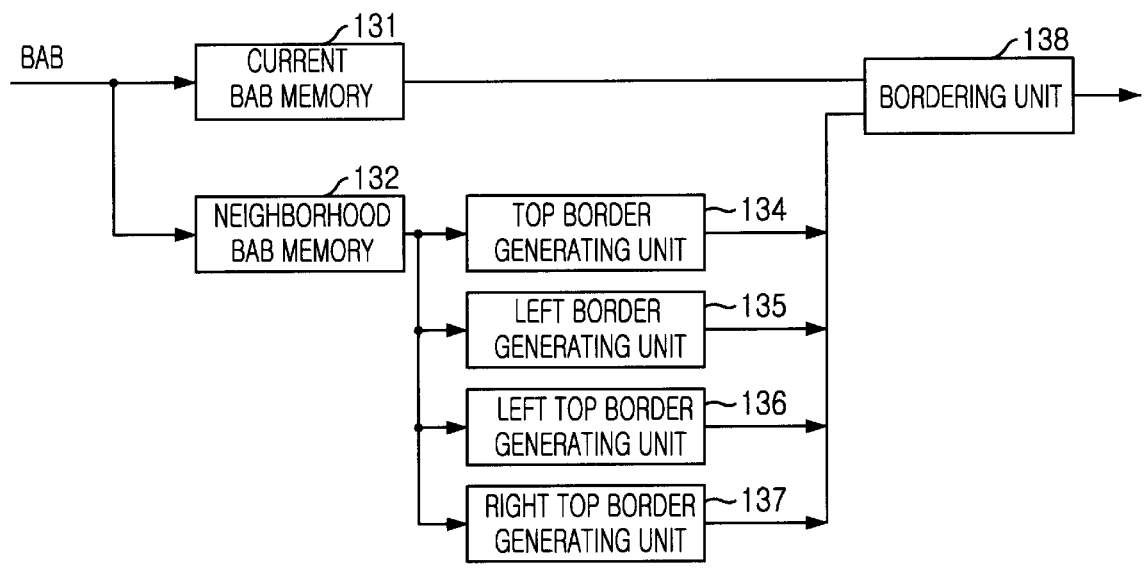
FIG. 13 is a block diagram of a frame mode bordering apparatus.

FIG. 13 is a block diagram of a frame mode bordering apparatus.

Figure 1:
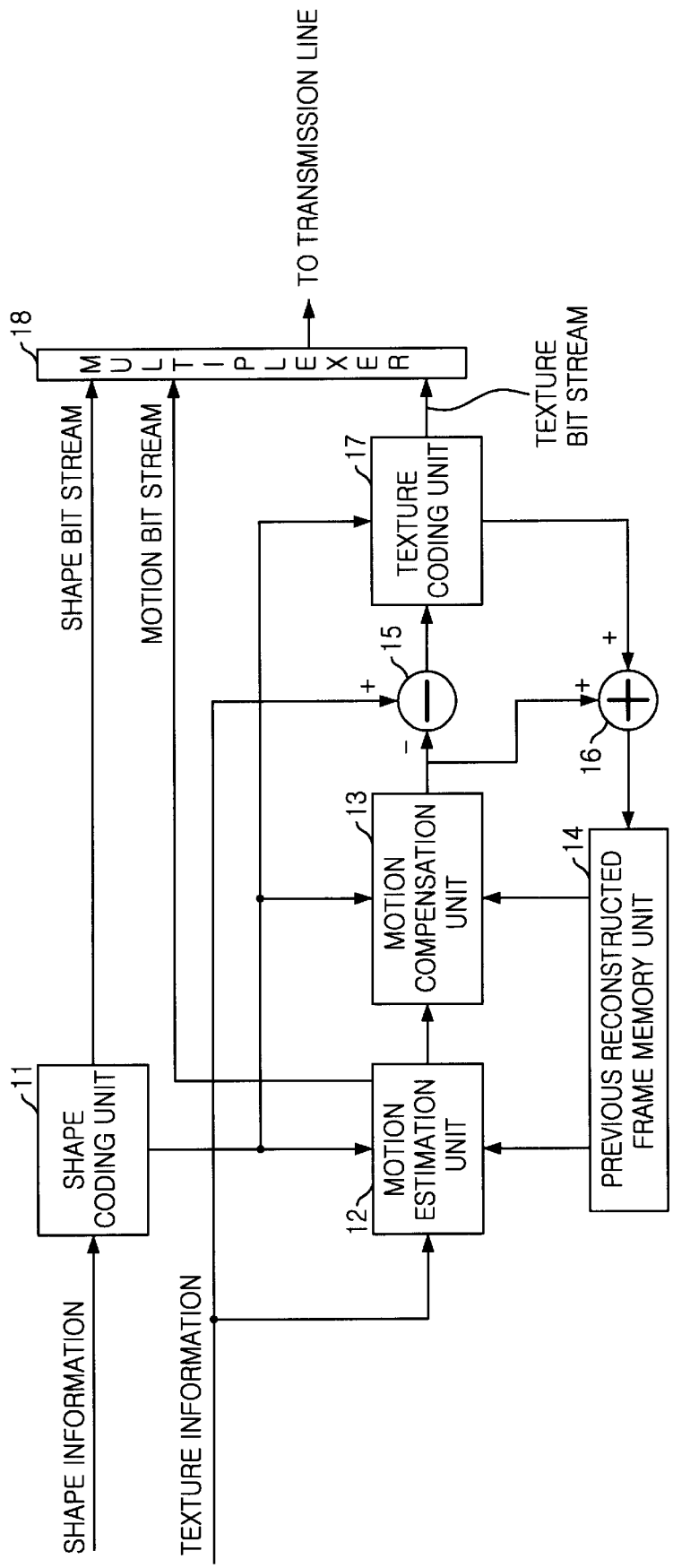
FIG. 1 is a block diagram of a general object-based video coder.
Figure 2A:
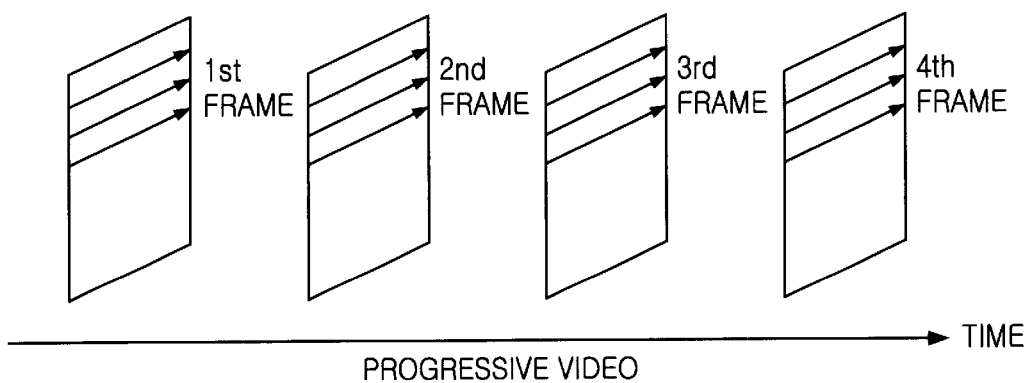
FIGS. 2a and 2b are diagrams for showing progressive scanning and interlaced scanning.
Figure 2B:
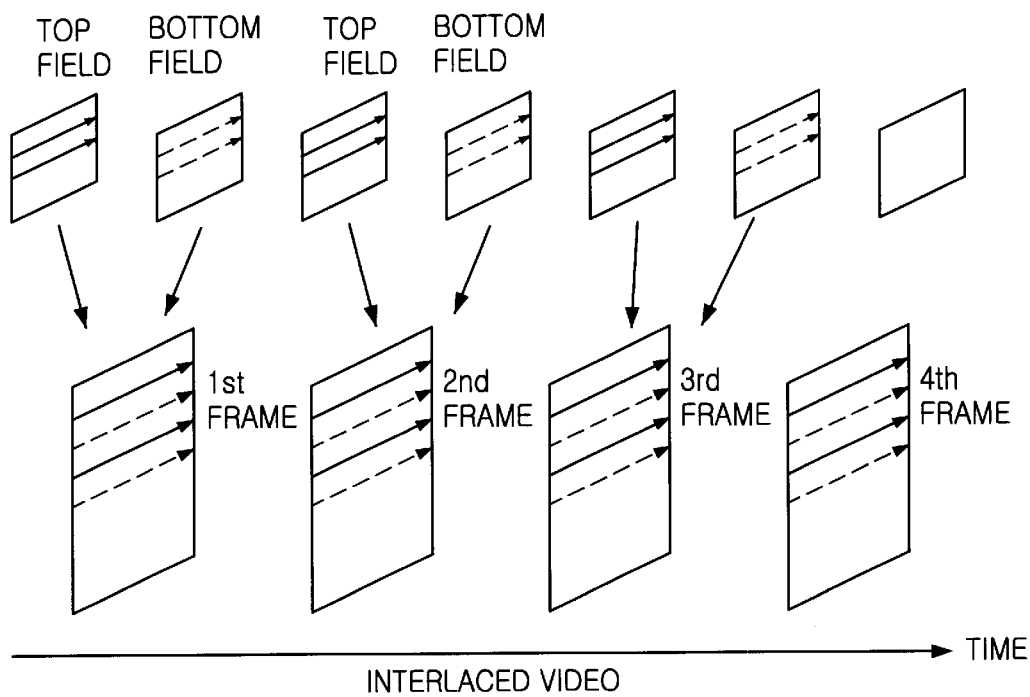
Figures 5A, 5B:
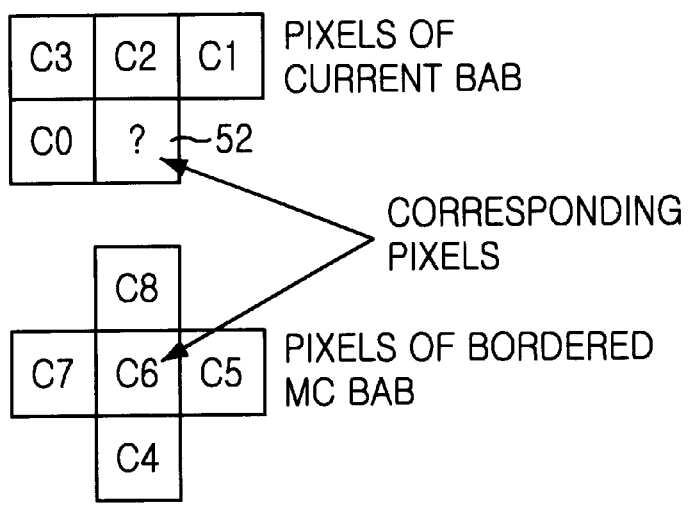
FIGS. 5a and 5b show an INTRA template and an INTER template which are used in context-based arithmetic encoding (CAE)
Figure 6:
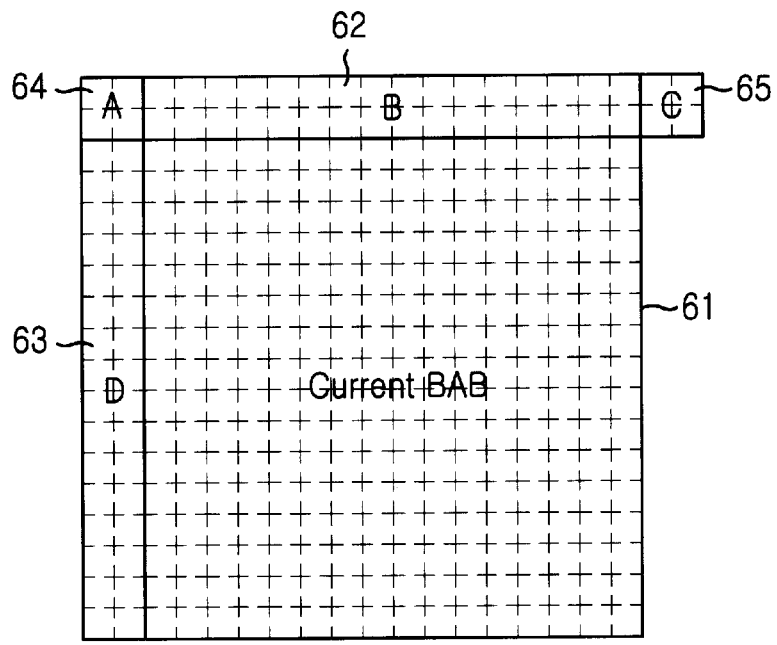
FIG. 6 shows a bordered current frame BAB.
Figure 7:
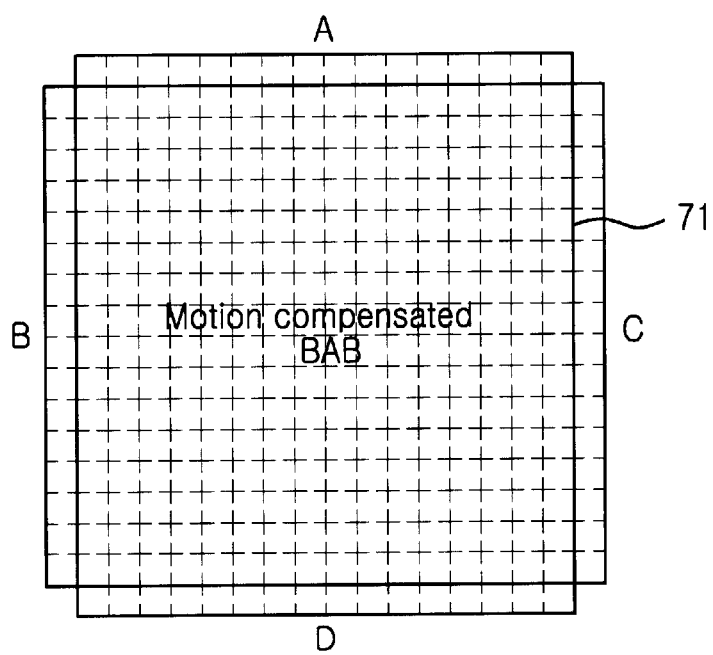
FIG. 7 shows a bordered MC frame BAB.
Figure 8A:
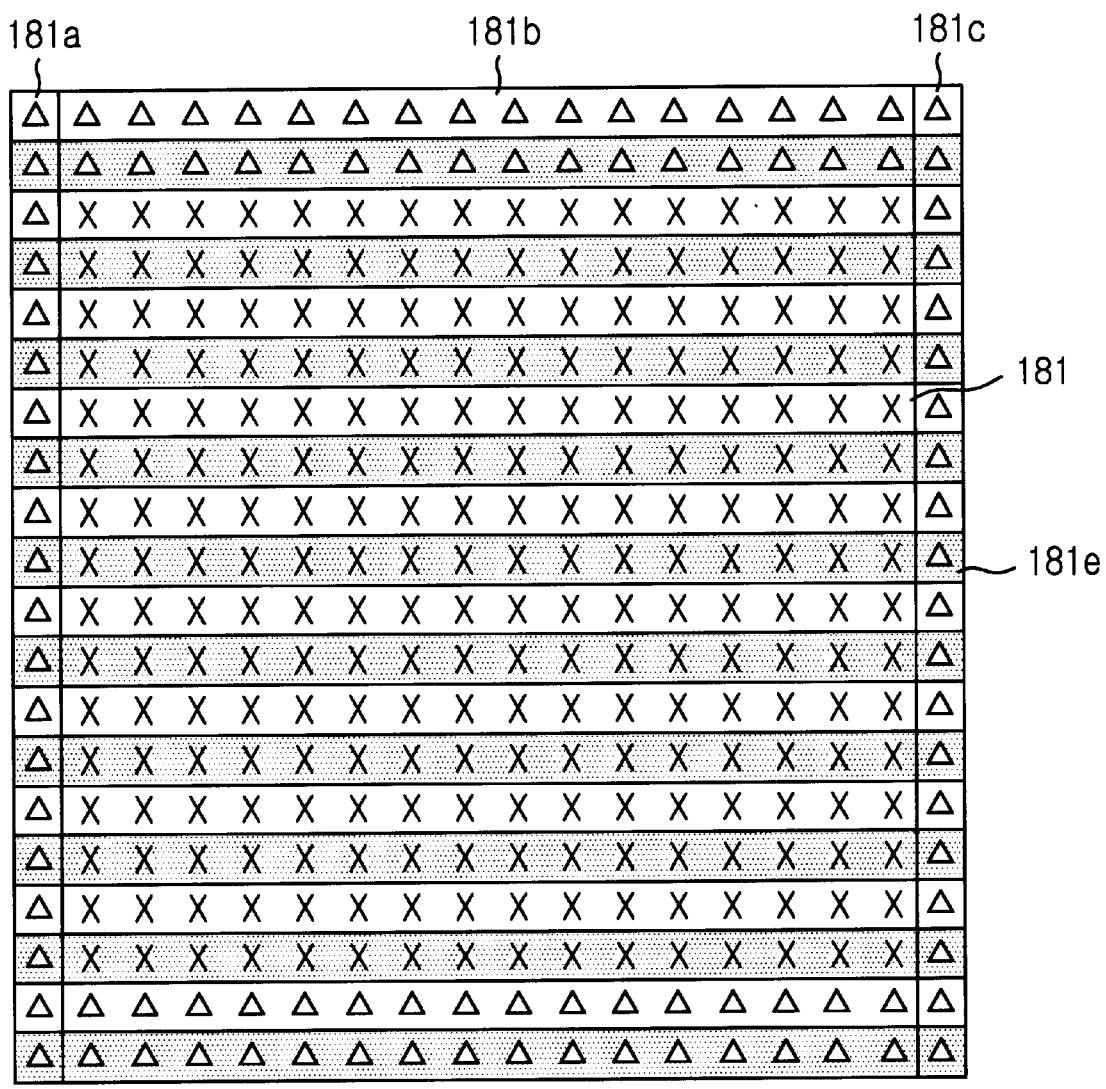
FIGS. 8a and 8b show pixels of the bordered MC frame BAB and pixels which are grouped into a top field and a bottom field in the BAB with the frame bordering maintained.
Figure 8B:
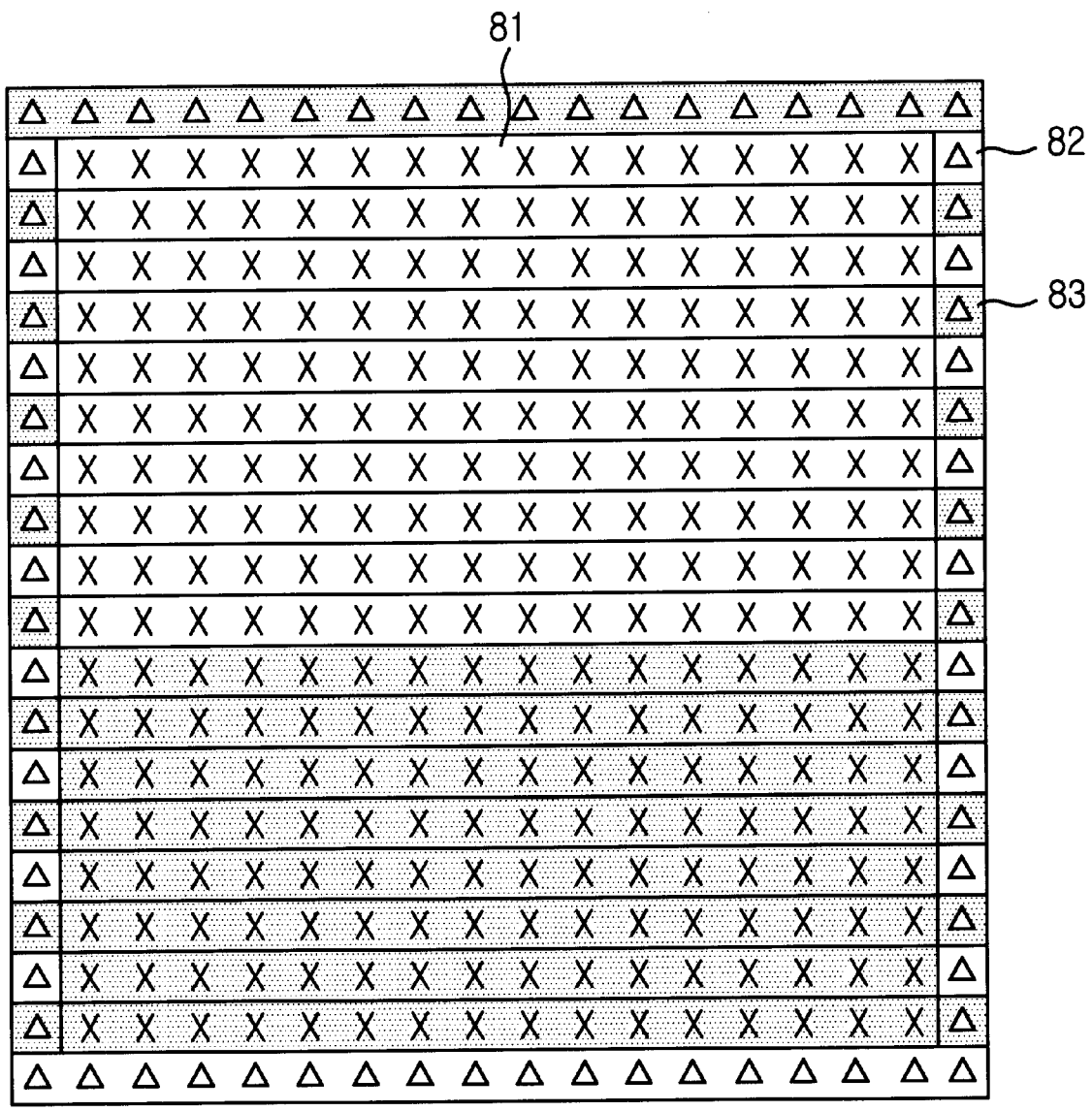

A current BAB memory 131 receives and stores a current BAB of shape information. A neighborhood BAB memory 132 stores a left BAB, a left top BAB, a top BAB, and a right top BAB which neighbor with the current BAB. A top border generating unit 134 reads pixels within a range of the top border 123 of 2i×N from the top BAB neighboring with the top of the current BAB and stores them. A left border generating unit 135 reads pixies within a range of the left border 125 of M×i at the most right side in the left BAB stored in the neighborhood BAB memory 132 and stores them. A left top border generating unit 136 reads pixies within a range of the left top border of 2i×i at the most right bottom side in the left top BAB of the current BAB from the neighborhood BAB memory 132 and stores them. A right top border generating unit 137 reads pixles within a range of the right top border of 2i×i at the most left bottom side in the right top BAB of the current BAB from the neighborhood BAB memory 132 and stores them. A bordering unit 138 reads the borders from the border generating units 133 to 137 and forms a bordered BAB as shown in FIG. 12. For the right border of the current BAB, as shown in FIG. 6, pixels within a range of a bordering size at the most right side of the current BAB are read and copied. That is, when the pixel 51 in FIG. 5a is at the border of the BAB and the values of the pixels C7, C3, and C2 cannot be acknowledged in the INTRA mode, an operation is performed under the definition of C7=C8, C3=C4, and C2=C3.

Figure 14A:
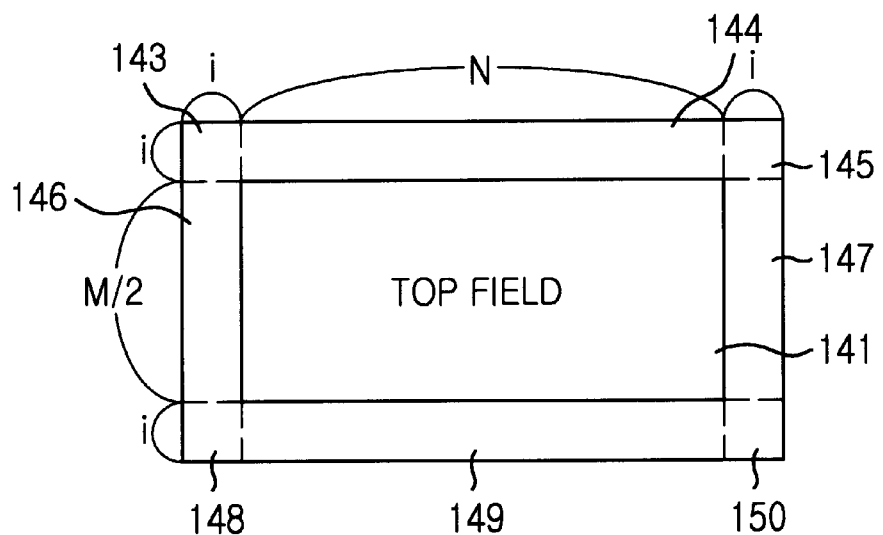
FIGS. 14a and 14b show embodiments of bordered current BAB field mode shape information according to the present invention.
Figure 14B:
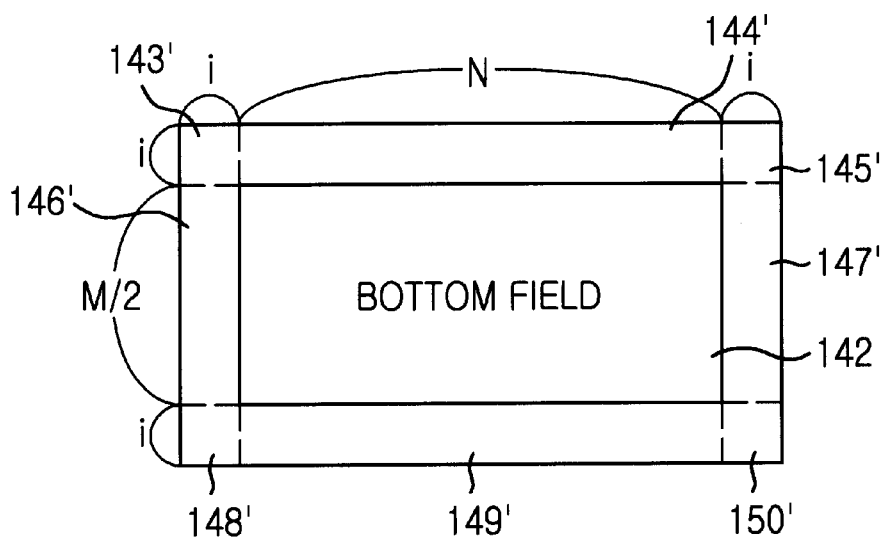

FIGS. 14a and 14b show embodiments of bordered current BAB field mode shape information according to the present invention.

The M×N size frame mode block 121 of the shape information to be coded is divided into a top field mode block 141 and a bottom field mode block 142, each having a size of M/2×N. Each block 141, 142 is bordered in all direction at a predetermined width, i. A top border 144, 144' and a bottom border 149, 149' of each field block 141, 142 have a size of i×N. A left top border 143, 143', a right top border 145, 145', a left bottom border 148, 148', and a right bottom border 150, 150' have a size of i×i. A left border 146, 146' and a right border 147, 147' have a size of M/2×i. The character "i" is the bordering width. The borders 143 to 150 of the top field are constructed of the pixels of top fields and the borders 143' to 150' of the bottom field are constructed of the pixels of bottom fields.

Figure 15:
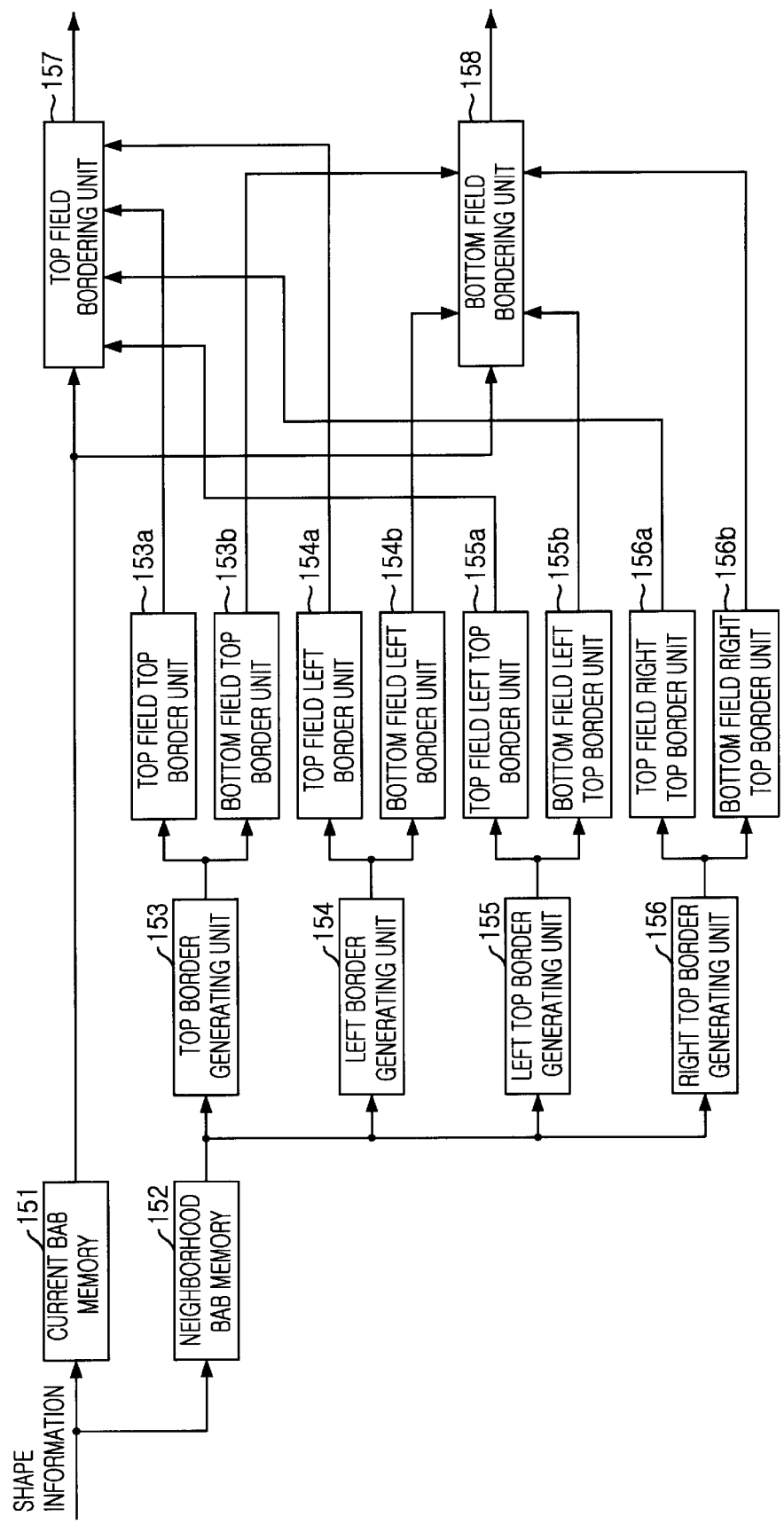
FIG. 15 is a block diagram of an embodiment of a field mode bordering apparatus according to the present invention.

FIG. 15 is a block diagram of an embodiment of a current field mode bordering apparatus according to the present invention.

A current BAB memory 151 receives and stores a current BAB of shape information. A neighborhood BAB memory 152 stores neighborhood BABs of a current BAB. A frame mode top border generating unit 153 reads pixels within a range of the top border 123 of 2i×N from a BAB neighboring with the top of the current BAB and stores them. A frame mode left border generating unit 154 reads pixels within a range of the left border 125 of M×i at the most right side in a left neighborhood BAB stored in the neighborhood BAB memory 152 and stores them. A frame mode left top border generating unit 155 reads pixels within a range of the left top border 122 of 2i×i at the most right bottom side in a left top BAB neighboring with the left top of the current BAB, the left top BAB being stored in the neighborhood BAB memory 152, and stores them. A frame mode right top border generating unit 156 reads pixels within a range of the right top border 124 of 2i×i at the most left bottom side in a right top BAB neighboring with the right top of the current BAB, the right top BAB being stored in the neighborhood BAB memory 152, and stores them. Each top field border generating unit 153a to 156a reads pixels within the range of the top field bordering size, i×N or i×i, from each corresponding frame mode border generating unit 153 to 156 and stores them. Each bottom field border generating unit 153b to 156b reads pixels within the range of the top field bordering size, i×N or i×i, from each corresponding frame mode border generating unit 153 to 156 and stores them. A top field bordering unit 157 reads borders from the top field border generating units 153a to 156a and constructs a bordered top field BAB as shown in FIG. 14a. A bottom field bordering unit 158 reads borders from the bottom field border generating units 153b to 156b and constructs a bordered bottom field BAB as shown in FIG. 14b.

The above description concerns frame mode and field mode bordering processes in the INTRA mode. In the INTER mode, motion occurs between a previous picture and a current picture. Therefore, contexts as shown in FIG. 5b should be constructed based upon an MC BAB and a current BAB before performing the CAE when coding in the INTER mode. As shown in FIG. 5b, shape information of the current pixel 52 is context-based arithmetic encoded with reference to the ambient pixels C0 to C3 and the corresponding pixel C6 in the previous frame and its ambient pixels C4, C5, C7, and C8.

Figure 16:
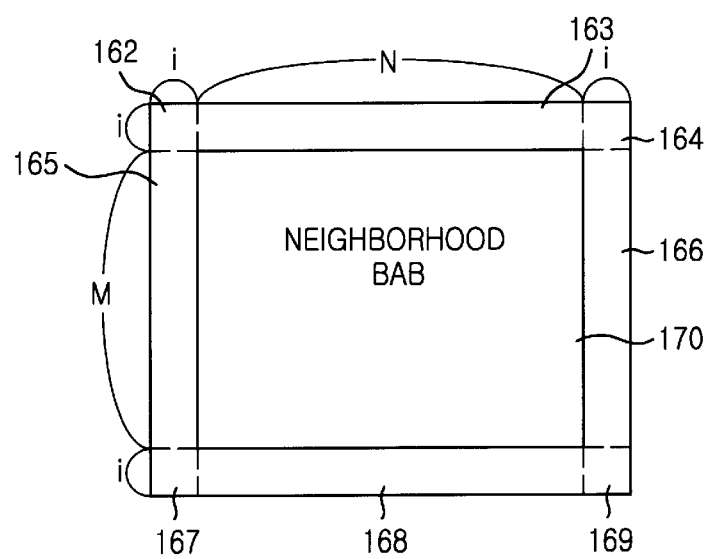
FIG. 16 shows an embodiment of bordered MC BAB frame mode shape information in an INTER mode.

FIG. 16 shows an embodiment of bordered MC frame mode shape information in the INTER mode.

A block 160 of shape information to be coded has a size of M×N. The block 160 is bordered by i pixels at its top, bottom, right, and left. A left top border 162, a right top border 164, a left bottom border 167, and a right bottom border 169 have a size of i×i. A top border 163 and a bottom border 168 have a size of i×N and a left border 165 and a right border 166 have a size of M×i. A character "i" is a bordering width.

Figure 17:
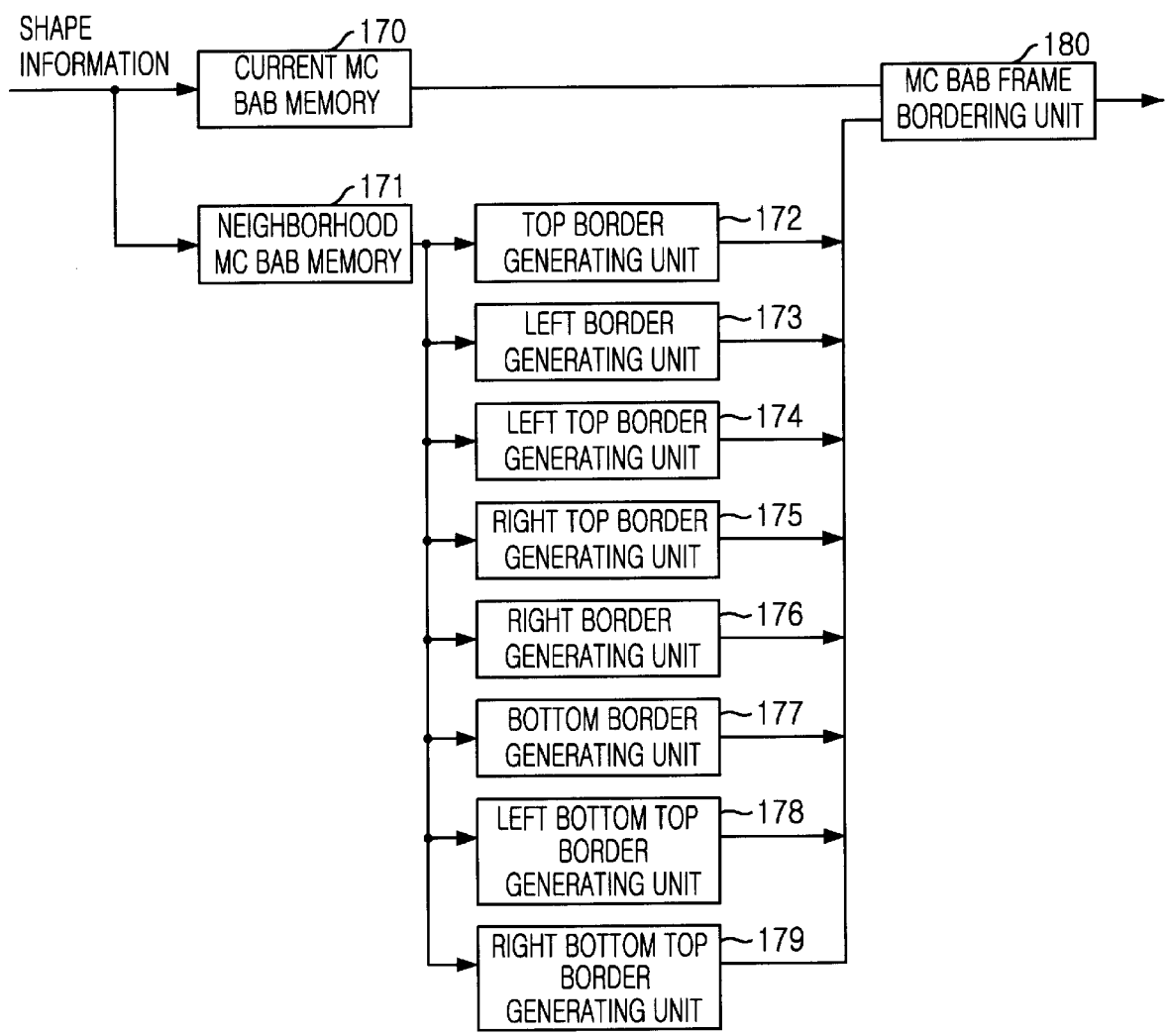
FIG. 17 is a block diagram of an apparatus for bordering an MC BAB in a frame mode.

FIG. 17 is a block diagram of an apparatus for bordering an MC BAB in a frame mode according to the present invention.

A current MC BAB memory 170 generates a current MC BAB from shape information and stores the current MC BAB. A neighborhood MC BAB memory 171 stores MC BABs neighboring with the current MC BAB. A top border generating unit 172 reads pixels within a range of i×N in a top MC BAB neighboring to the top of the current BAB from the neighborhood MC BAB memory 171 and stores them. A left border generating unit 173 reads pixels within a range of M×i at the most right side in a left MC BAB neighboring to the left of the current MC BAB from the neighborhood MC BAB memory 171 and stores them. A left top border generating unit 174 reads pixels within a range of i×i at the most right bottom side in a left top MC BAB neighboring with the current MC BAB from the neighborhood MC BAB memory 171 and stores them. A right top border generating unit 175 reads pixels within a range of i×i at the most left bottom side in a right top BAB neighboring with the current MC BAB from the neighborhood MC BAB memory 171 and stores them. A right border generating unit 176 reads pixels within a range of i×N at the most left side in an MC BAB neighboring with the right side of the current MC BAB 160 from the neighborhood MC BAB memory 171 and stores them. A bottom border generating unit 177 reads pixels within a range of i×N at the top side in an MC BAB neighboring with the bottom side of the current MC BAB 160 from the neighborhood MC BAB memory 171 and stores them. A left bottom border generating unit 178 reads pixels within a range of i×N at the right top side in an MC BAB neighboring with the left bottom side of the current MC BAB 160 from the neighborhood MC BAB memory 171 and stores them. A right bottom border generating unit 179 reads pixels within a range of i×N at the left top side in an MC BAB neighboring with the right bottom side of the current MC BAB 160 from the neighborhood MC BAB memory 171 and stores them. An MC BAB frame bordering unit 180 receives the current MC BAB and the borders from the respective current MC BAB memory 170 and border generating units 172 to 179 and borders the current MC BAB 160 as shown in FIG. 16.

Figure 18A:
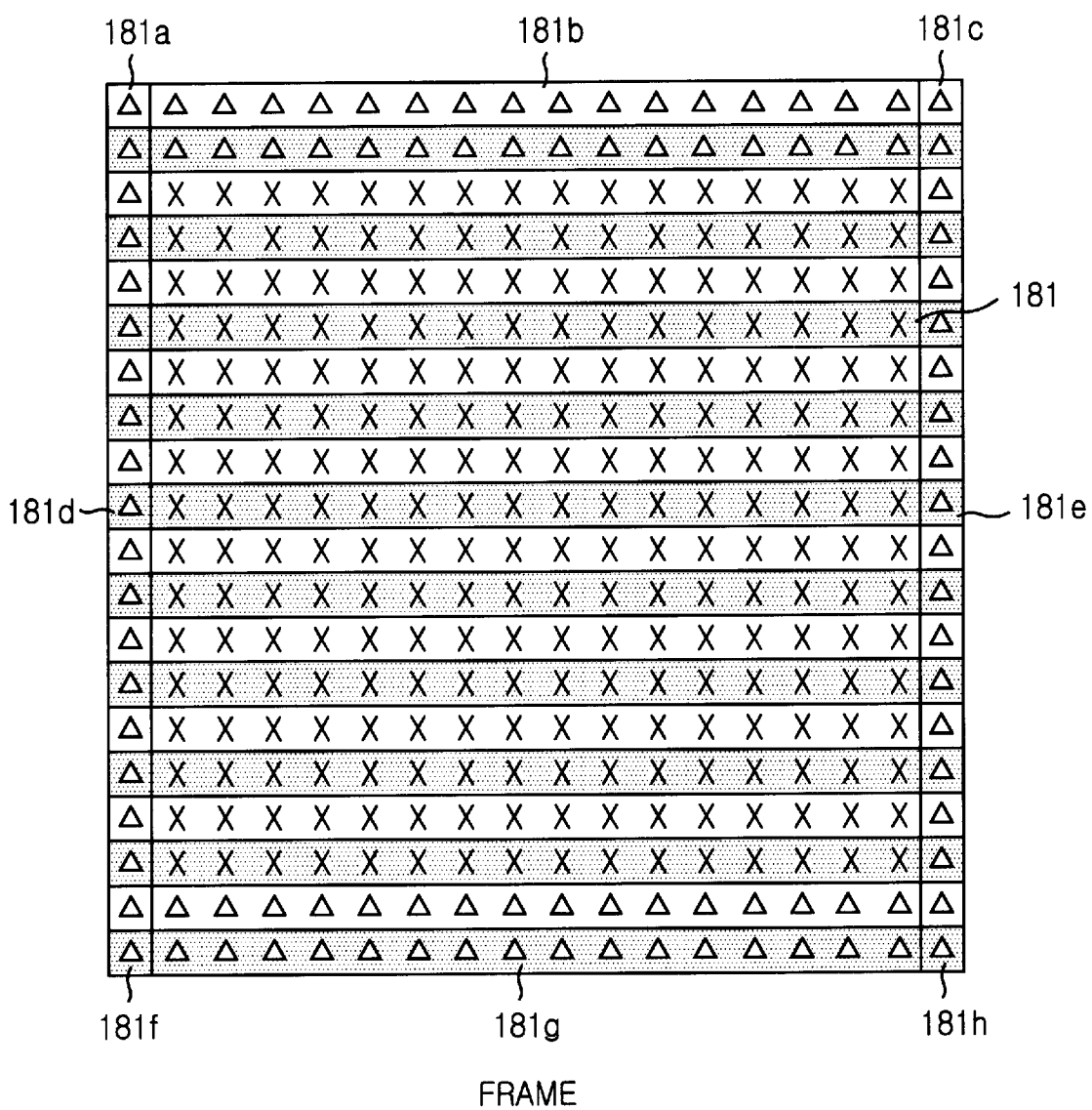
Figures 18B, 18C:
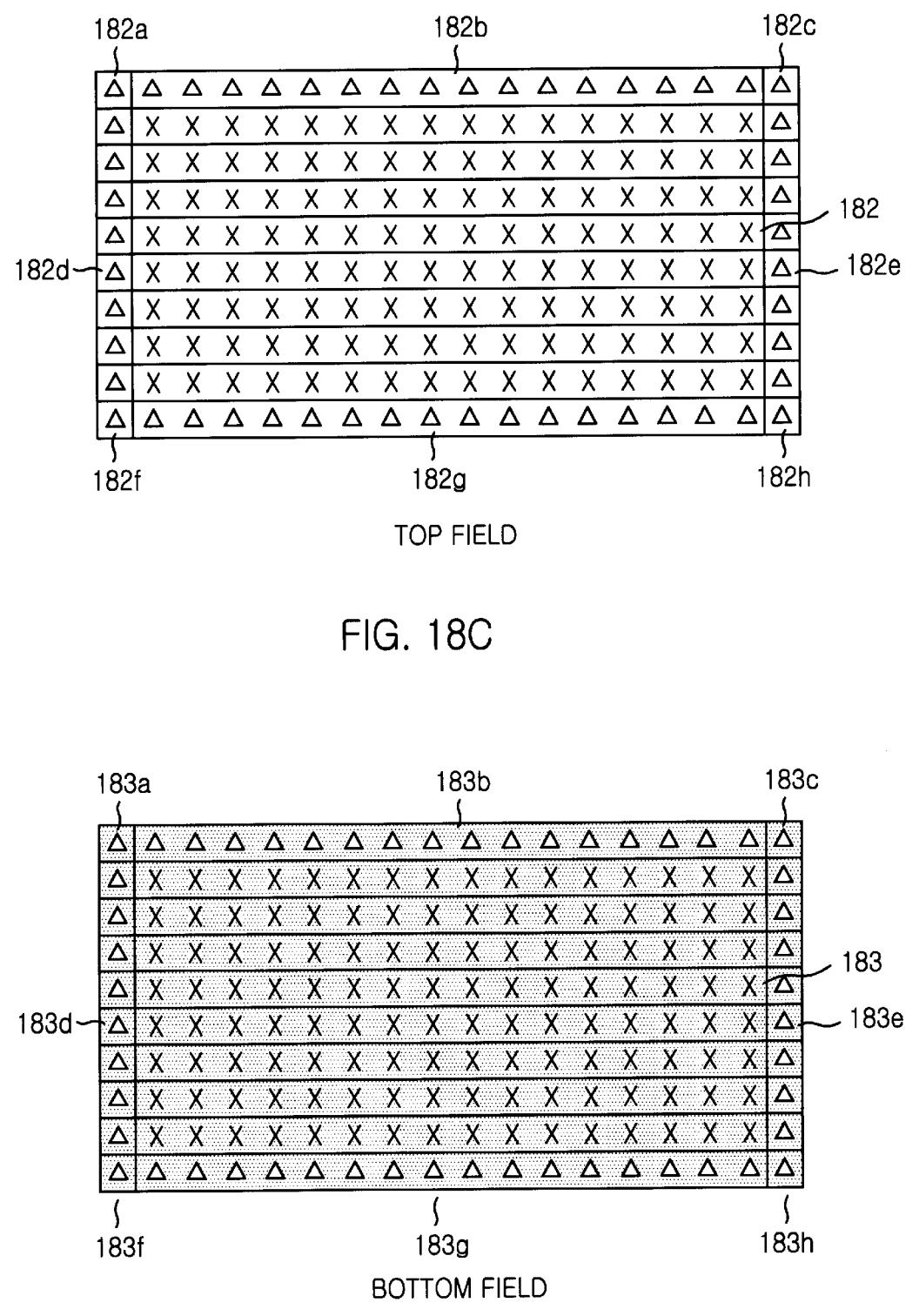

FIGS. 18a to 18c show embodiments of bordered MC BAB field mode shape information in the INTER mode.

FIG. 18a shows an embodiment of a result of bordering a 16×16 size BAB 181 to be coded. A left top border 181a, a right top border 181c, a left bottom border 181f, and a right bottom border 181h, each has 2×1 pixels and a top border 181b and a bottom border 181g, each has 2×16 pixels through the bordering.

FIG. 18b shows a top field block 182 of 8×16 which is bordered by border pixels of top fields. The bordering of the top field block 182 is performed in such a manner that a pixel for a top field left top border 182a is taken from a pixel of the top field in the frame left top border 181a; a pixel for a top field right top border 182c, a pixel of the top field in the right top border 181c; a pixel for a top field left bottom border 182f, a pixel of the top field in the left bottom border 181f; and a pixel for a top field right bottom border 182h, a pixel of the top field in the right bottom border 181h.

FIG. 18c shows a bottom field block 183 of 8×16 which is bordered by borders corresponding to the bottom field. Pixels for borders 183a to 183h are taken from pixels of the bottom fields in the corresponding frame borders 181a to 181h.

Figure 19:
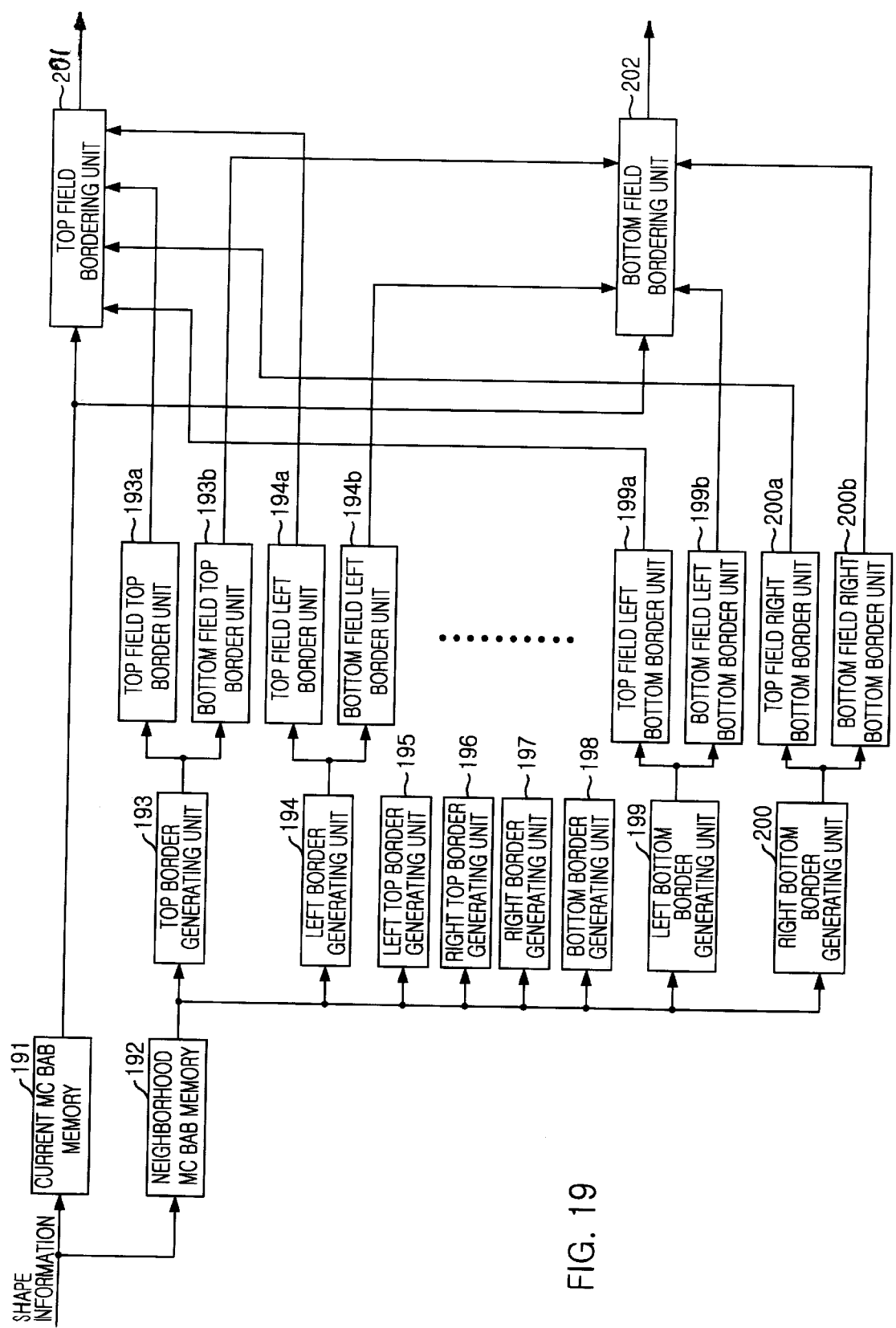
FIG. 19 is a block diagram of an apparatus for bordering an MC BAB in a field mode.

FIG. 19 is a block diagram of an apparatus for performing field mode bordering with respect to an MC BAB.

Blocks from a current MC BAB memory 191 to a right bottom border generating unit 200 have the same functions as the blocks from the current MC BAB memory 170 to the right bottom border generating unit 200 depicted in FIG. 17 other than that a size of top and bottom borders is 2i×N, so detailed description is omitted. Top field border generating units 193a to 200a read pixels of top fields as many as a top field bordering size of i×N from the corresponding frame border generating units 193 to 200 and store them. Similarly, bottom field border generating units 193b to 200b read pixels of bottom fields as many as a bottom field bordering size of i×N from the corresponding frame border generating units 193 to 200 and store them. A top field bordering unit 201 reads borders from the top field border generating units 193a to 200a and forms a bordered top field MC BAB as shown in FIG. 18b. A bottom field bordering unit 202 reads borders from the bottom field border generating units 193b to 200b and forms a bordered bottom field MC BAB as shown in FIG. 18c.

Figure 20:
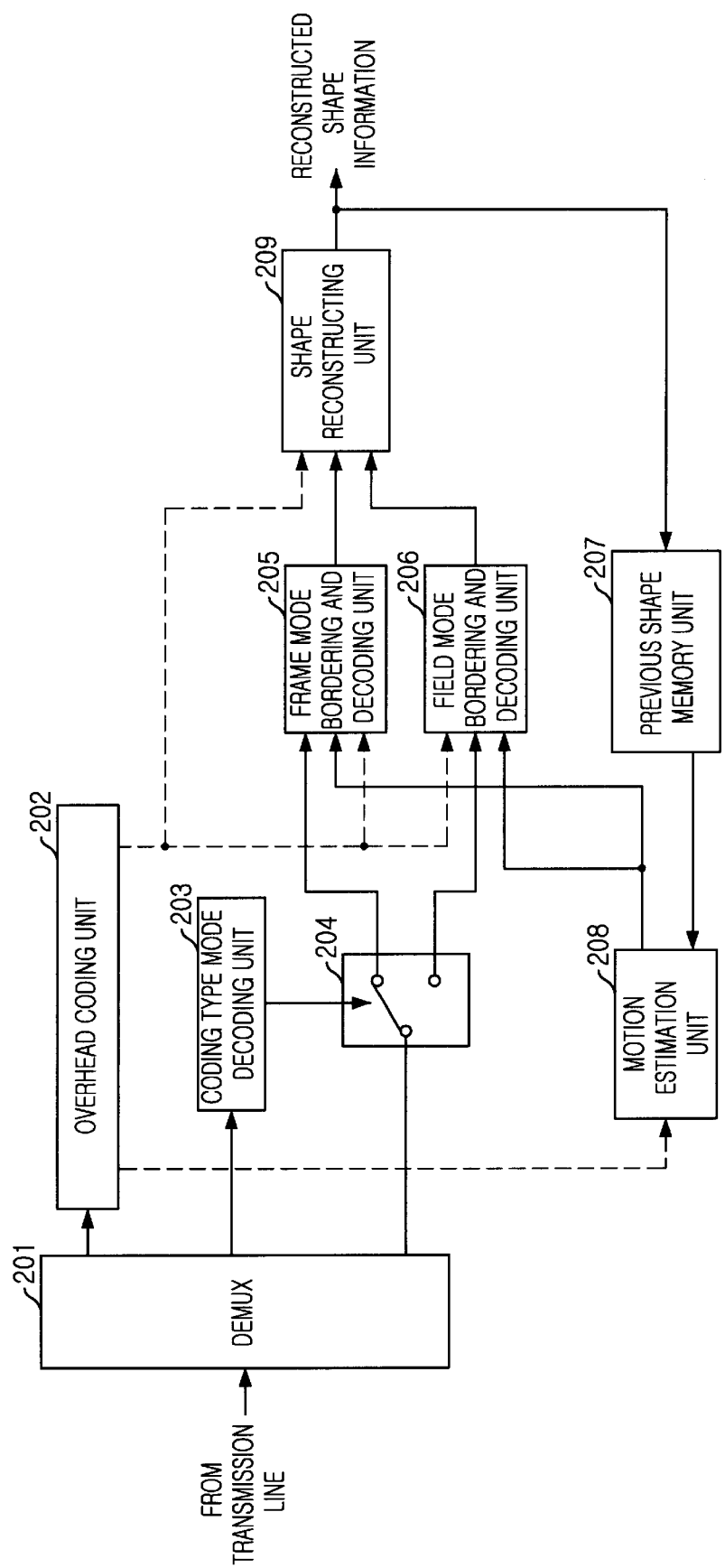
FIG. 20 is a block diagram of a shape information decoding apparatus for adaptively bordering according to the present invention.

FIG. 20 is a block diagram of an embodiment of a shape information decoding apparatus having an adaptive bordering unit according to the present invention.

A demultiplexer 201 demultiplexes coded data received via a transmission line. An overhead decoding unit 202 decodes overhead information, such as BAB_type, conversion ratio (CR), and scan type (ST), contained in data received from the demultiplexer 201. A coding mode decoding unit 203 decodes coding mode data received from the demultiplexer 201. A switching unit 204 switches the coded shape information received from the demultiplexer 201 according to the coding mode received from the coding mode decoding unit 203. A frame mode bordering and decoding unit 205 borders and decodes the shape information received via the switching unit 204 and motion compensated, previous shape information from a frame with the overhead information (BAB_type, CR, ST). A field mode bordering and decoding unit 206 borders and decodes the shape information received via the switching unit 204 and motion compensated, previous shape information from a separate field using the overhead information (BAB_type, CR, ST). A previous shape memory 207 stores the previous shape information received from the frame mode bordering and decoding unit 205 and the field mode bordering and decoding unit 206. A motion compensation unit 208 receives motion information from the overhead decoding unit 202 and the previous shape information from the previous shape memory 207 and performs motion compensation before transmission to the frame mode bordering and decoding unit 205 and the field mode bordering and decoding unit 206. A shape reconstructing unit 209 receives the overhead information from the overhead decoding unit 202 and reconstructs the shape information received from the frame mode bordering and decoding unit 205 and the field mode bordering and decoding unit 206 using the overhead information.

The overhead decoding unit 202 decodes the overheads, which are contained in a bit stream inputted to the demultiplexer 201 via the transmission line. The overheads are necessary for the shape information decoding. The decoding apparatus controls the decoding process with the decoded overhead information. If a coding apparatus uses the CAE, the overhead information includes BAB_type, CR, ST, and motion information. "BAB_type" represents a type of the shape information in the BAB. When BAB_type is All_0 which indicates entire background information or All_255 which indicates entire object information, this information is transmitted to the decoding units 205 and 206. The decoding units 205 and 206 reconstruct the shape information. A shape coding mode (SCM) is decoded at the coding mode decoding unit 203 and used to control the switching unit 204. If the SCM is the frame mode, the bit stream outputted from the demultiplexer is inputted to and decoded at the frame mode bordering and decoding unit 205. If the SCM is the field mode, the bit stream outputted from the demultiplexer is inputted to and decoded at the field mode bordering and decoding unit 206. The motion compensation unit 208 produces a motion compensated BAB using the previous frame of a reference picture stored in the previous shape memory 207 and the decoded motion information from the overhead decoding unit 202. The motion compensated BAB is inputted to the frame mode bordering and decoding unit 205 and the field mode bordering and decoding unit 206. The frame mode bordering and decoding unit 205 and the field mode bordering and decoding unit 206, each decodes a reconstructed BAB using the overhead from the overhead decoding unit 202, the bit stream received via the switching unit 204, and the motion compensated BAB received from the motion compensation unit 208. The shape reconstructing unit 209 reconstructs the shape information with the reconstructed BAB and the overhead of the overhead decoding unit 202. The reconstructed shape information is stored in the previous shape memory 207 and used when the next shape information is decoded.

As illustrated above, the shape information decoding apparatus has the coding mode decoding unit 203, which decodes data indicating the coding mode (frame mode or field mode) to detect a frame/field coding mode signal, and performs the decoding at the frame mode bordering and decoding unit 205 or the field mode bordering and decoding unit 206 according to a result of the detection.

Figure 21:
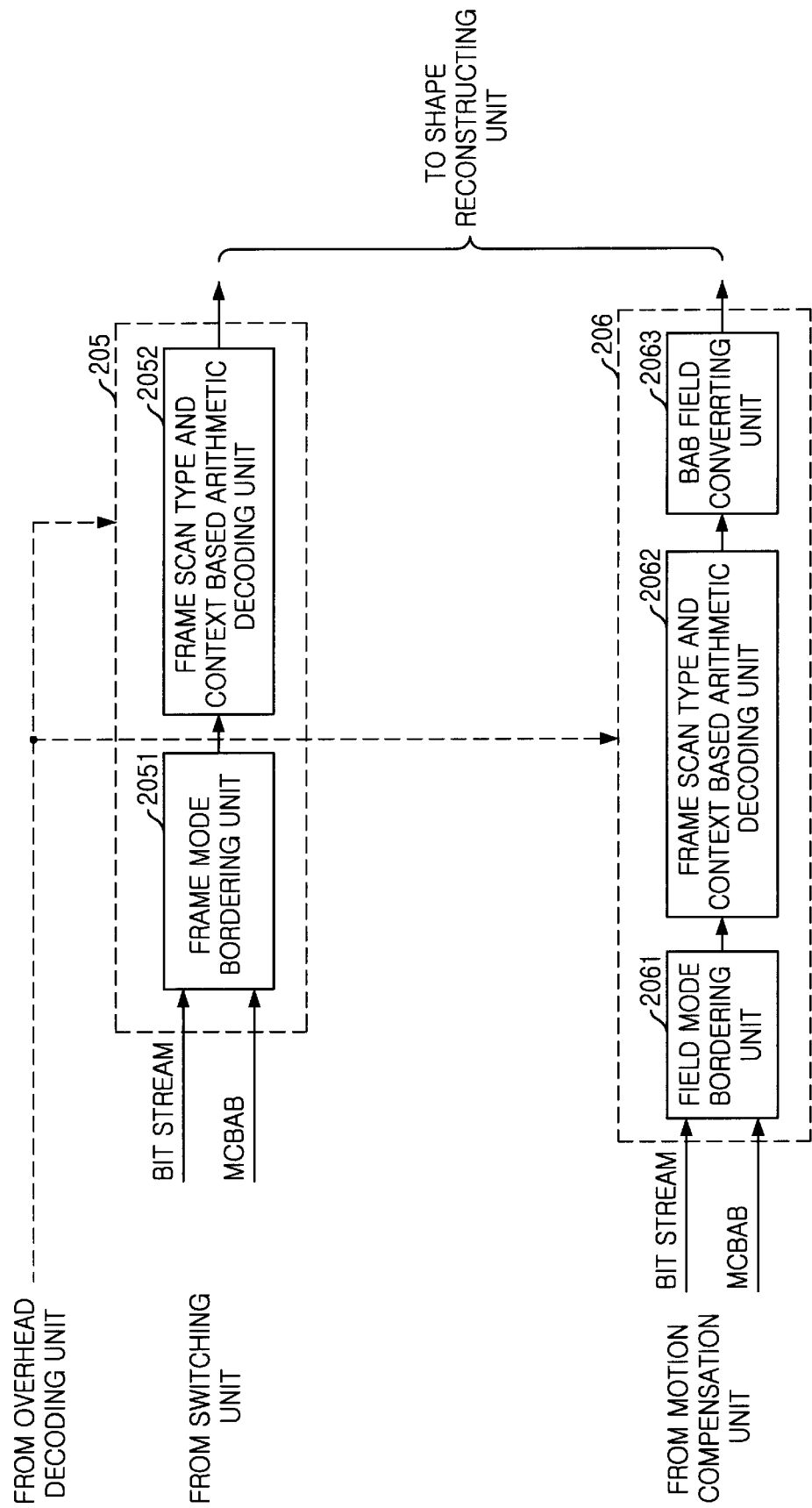
FIG. 21 is a block diagram of a frame mode bordering and decoding unit and a field mode bordering and decoding unit, each having an adaptive bordering unit, according to the present invention.

FIG. 21 is a block diagram of a frame mode bordering and decoding unit and a field mode bordering and decoding unit, each having an adaptive bordering unit, according to the present invention.

The frame mode bordering and decoding unit 205 comprises a frame mode bordering unit 2051 and a frame scan type and CAE unit 2052. The field mode bordering and decoding unit 206 comprises a field mode bordering unit 2061, a field scan type and Context-based Arithmetic Decoding unit 2062 and a BAB field converting unit 2063. The frame mode bordering and decoding unit 205 performs the frame bordering during the decoding through the same method as in the frame bordering during the coding. The frame bordering is performed with respect to a current BAB and a MC BAB. After completing the bordering, INTRA or INTER mode context-based arithmetic decoding is performed.

The field mode bordering and decoding unit 206 performs the field bordering during the decoding using the same method as in the field bordering during the coding. In other words, a top field is bordered by pixels of top fields and a bottom field is bordered by pixels of bottom fields. The field bordering is performed with respect to a current BAB and a_MC BAB. After completing the bordering, INTRA or INTER mode context-based arithmetic decoding is performed.

As illustrated, the present invention performs a bordering process before coding or decoding blocks of shape information in an interlaced picture. In case of frame based coding, frame bordering is performed and in case of field based coding, field bordering is performed. For the field bordering, top and bottom fields are separately bordered. When bordering the top field, pixels of top fields are taken for the bordering. The bordering of the bottom field is performed through the same method. Compared with the case where a result of the frame bordering is applied just as it is when performing the field based coding, this method according to the present invention increases correlation between neighboring pixels, thereby decreasing the number of coded bits a lot.

It will be apparent to those skilled in the art that various modifications and variations can be made in a shape information coding and decoding apparatus for adaptively bordering and method of the present invention without deviating from the spirit or scope of the invention. Thus, it is intended that the present invention cover the modifications and variations of this invention provided they come within the scope of the appended claims and their equivalents.

What is claimed is:

1. In a shape information coding apparatus for determining a mode based upon characteristics of a binary alpha block (BAB) adaptively performing a field bordering, and coding said shape information by field mode bordering and coding means, when a field type is determined as said coding mode, said field mode bordering and coding means comprising:

current BAB memory means for receiving said shape information and storing a current BAB;

neighborhood BAB memory means for receiving said shape information and storing BABs neighboring with said current BAB;

top border generating means for reading pixels within a bordering size in a BAB which neighbors with a top of said current BAB stored in said neighborhood BAB memory means and storing them;

left border generating means for reading pixels within a bordering size at a most right side in a BAB which neighbors with a left side of said current BAB stored in said neighborhood BAB memory means and storing them;

left top border generating means for reading pixels within a bordering size at a most right bottom side in a BAB which neighbors with a left top side of said current BAB stored in said neighborhood BAB memory means and storing them; right top border generating means for reading pixels within a bordering size at a most left bottom side in a BAB which neighbors with a right top side of said current BAB stored in said neighborhood BAB memory means and storing them;

multiple top field border generating means for reading top field borders from said multiple border generating means and storing them;

multiple bottom field border generating means for reading bottom field borders from said multiple border generating means and storing them;

top field bordering means for reading said top field borders from said multiple top field border generating means and constructing a bordered top field BAB; and bottom field bordering means for reading said bottom field borders from said multiple bottom field border generating means and constructing a bordered bottom field BAB.

2. The apparatus according to claim 1, wherein said left border generating means performs the bordering in M×1 size; said top border generating means, in 2i×N size; and said left top and right top border generating means, in 2i×i size, wherein "M" is a length of said BAB, "N" is a breadth of said BAB, and "i" is a width of the border.

3. The apparatus according to claim 1, wherein said left border generating means reads pixels within the bordering size of M/2×i and stores them; said top and bottom border generating means reads pixels within the bordering size of 2i×N and store them; and said left top and right top border generating means read pixels within the bordering size of 2i×i and store them; wherein "M" is a length of said BAB, "N" is a breadth of said BAB, and "i" is a width of the border.

* * * * *